United States Patent
Mackey

[11] Patent Number: 5,873,933
[45] Date of Patent: Feb. 23, 1999

[54] MALLEABLE PLAY MATERIAL COMPOUND RESEMBLING LOOSE SOIL

[75] Inventor: Jack D. Mackey, Hawthorne, Calif.

[73] Assignee: Mattel, Inc, El Segundo, Calif.

[21] Appl. No.: 912,552

[22] Filed: Aug. 18, 1997

Related U.S. Application Data

[63] Continuation-in-part of Ser. No. 895,752, Jul. 17, 1997.
[51] Int. Cl.$^6$ .............................. C08L 1/28; C08L 101/12
[52] U.S. Cl. .................................. 106/205.1; 106/287.34
[58] Field of Search ............................ 106/205.1, 287.34

[56] References Cited

U.S. PATENT DOCUMENTS

| | | |
|---|---|---|
| 2,541,851 | 2/1951 | Wright . |
| 2,977,236 | 3/1961 | Neukom . |
| 3,135,648 | 6/1964 | Hawkins . |
| 3,384,498 | 5/1968 | Ahrabi . |
| 3,607,332 | 9/1971 | Wingfield . |
| 3,632,786 | 1/1972 | Nickerson . |
| 3,634,280 | 1/1972 | Dean et al. . |
| 3,661,790 | 5/1972 | Dean et al. . |
| 3,804,654 | 4/1974 | Liu . |
| 3,809,661 | 5/1974 | Shapero et al. . |
| 3,873,485 | 3/1975 | Fichera . |
| 3,886,112 | 5/1975 | Watson et al. . |
| 4,080,213 | 3/1978 | Mori et al. . |
| 4,231,914 | 11/1980 | Born et al. . |
| 4,336,071 | 6/1982 | Schnorrer . |
| 4,459,375 | 7/1984 | Saeki et al. . |
| 4,459,377 | 7/1984 | Saeki et al. . |
| 4,460,716 | 7/1984 | Saeki et al. . |
| 4,618,491 | 10/1986 | Kanematu et al. . |
| 4,735,660 | 4/1988 | Cane . |
| 4,891,266 | 1/1990 | Keith . |
| 5,171,766 | 12/1992 | Mariano et al. . |
| 5,258,068 | 11/1993 | Shapero et al. . |
| 5,310,421 | 5/1994 | Shapero et al. . |
| 5,374,384 | 12/1994 | Berks et al. . |
| 5,473,009 | 12/1995 | Kimmura et al. . |
| 5,491,180 | 2/1996 | Kiuchi et al. . |
| 5,506,290 | 4/1996 | Shapero . |

Primary Examiner—David Brunsman
Attorney, Agent, or Firm—Roy A. Ekstrand

[57] ABSTRACT

A malleable play material binder is combined with a substantially greater quantity of sand to form a granular malleable amorphous play material having an unusual tactile characteristic. The play material binder may comprise a conventional play material. In the preferred embodiment, the play material binder is formed by mixing a soluble cellulose, a polyvinyl alcohol, propylene glycol, water, sodium tetraborate, sodium carbonate and a light mineral oil.

7 Claims, 1 Drawing Sheet

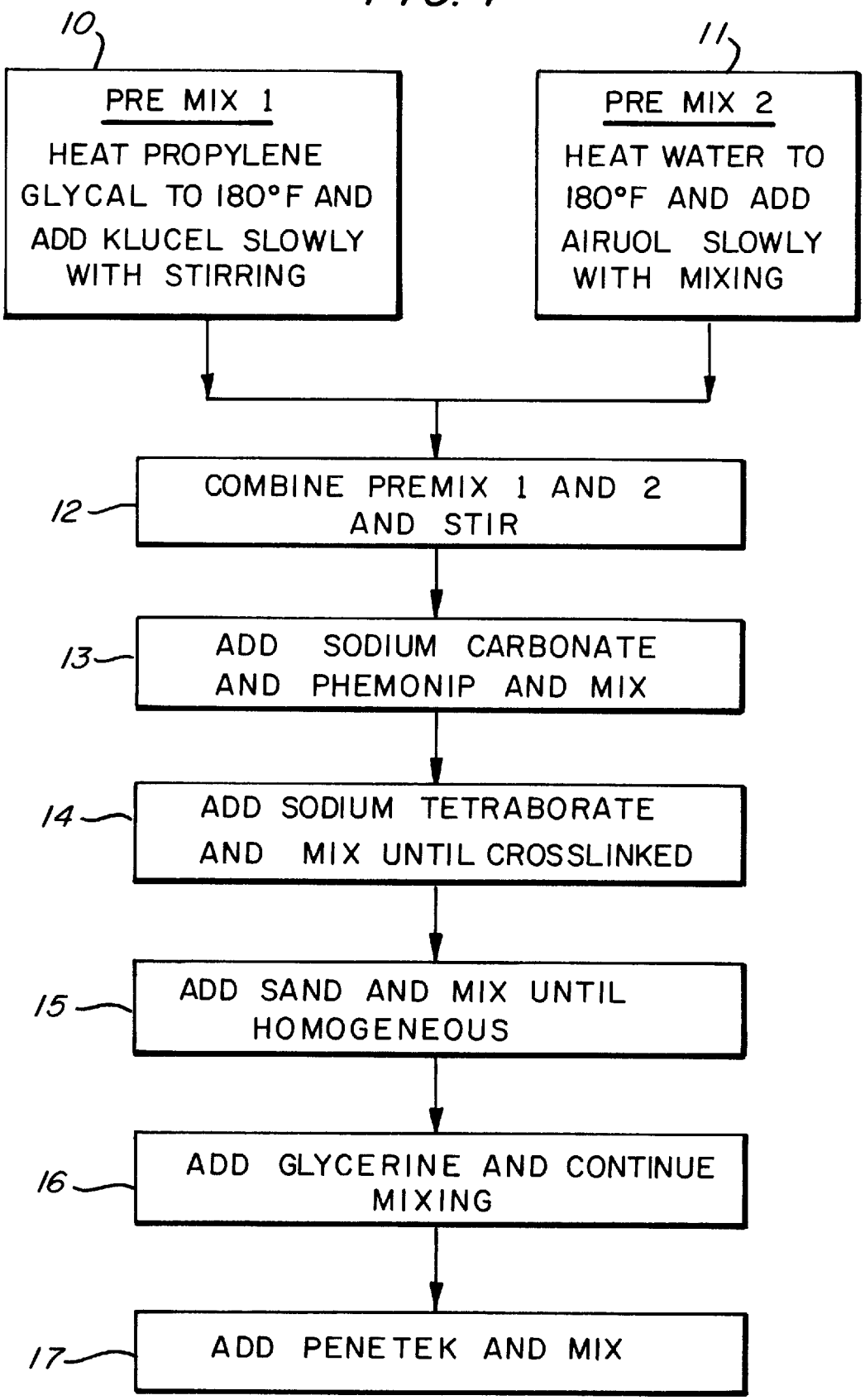

MALLEABLE PLAY MATERIAL COMPOUND RESEMBLING LOOSE SOIL

CROSS-REFERENCE TO RELATED APPLICATION

This application is a continuation in part of a copending application Ser. No. 08/,895,752 filed Jul. 17, 1997 in the names of Jack D. Mackey and Susan A. Reyes and entitled MALLEABLE PLAY MATERIAL COMPOUND which is assigned to the assignee of the present application and incorporated herein by reference.

FIELD OF THE INVENTION

This invention relates generally to play material compositions and particularly to those intended for use by young children in play patterns traditionally undertaken outdoors in loose soil or sand environments.

BACKGROUND OF THE INVENTION

Play materials of different types have been provided by practitioners in the toy arts for many years. The basic objective of such play materials is to amuse children and adults and to aid in the development of manual skills and dexterity as well as creativity. While the variety of such play material compounds is virtually endless, all generally involve the use of free-forming or malleable materials such as oil-based or water-based gums and gel compounds. Such materials facilitate the malleable or manipulatable material which may be easily shaped by the user. Certain materials have been provided which are moldable and tend to retain their shape such as modeling clay or the like. Others, however, have been provided which are looser and more free flowing such as novelty play materials and compounds. Still others are gel-like and provide interesting characteristics such as shaking or quivering similar to gelatin dessert products.

A basic difference often found in such malleable play materials is the difference between materials which are nondrying versus those which harden or dry. In the former, various base components in the malleable play material binder are utilized which tend to retain water in the compound and resist drying. In others, non-water bases such as oil or the like are selected to inhibit drying or hardening. As for materials intended to dry and harden, one of the most common types is that known throughout the years as pottery clay or similar compounds.

In addition to characteristics tending to render play materials hardening or nonhardening, practitioners in the art exert substantial effort in producing malleable play materials having the desired feel or tactile characteristic. Thus, the smoothness and softness as well as the tendency for play materials to be either sticky or slippery in some degree has all received substantial attention by practitioners in the art in endeavoring to obtain an interesting and amusing feel to both respective play material compounds.

The present invention also relates to the play patterns of young children carried forward outdoors with sand or loose soil. For example, children often enjoy making sand castles, etc. when at the beach. Additionally, children may enjoy imitating road building and construction arts using toy vehicle bulldozers, graders, power shovels and the like. Unfortunately, the use of loose sand or soil limits such play activities to outdoor sites due to the "mess" associated with sand and loose soil.

For example, U.S. Pat. No. 5,258,068 issued to Shapero, et al. sets forth a PLAY MATERIAL COMPOSITION formed of a guar gum, EDTA DOWICIL 200 methylparaben and propylparaben together with a monosodium phosphate calcium buffer. A glycerin and colorant mixture is combined with the remaining ingredients to complete the play material.

U.S. Pat. No. 4,735,660 issued to Cane sets forth a CROSS-LINKED GEL MODELING COMPOSITION of various colors that is cohesively strong but pliable and ductile. A quantity of wood flour is combined with a water-based gel using cross linkable guar gum of a gellant.

U.S. Pat. No. 5,310,421 issued to Shapero, et al. sets forth a PLAY MATERIAL formed using a self cross-linking sodium alginate combined with germaben II-E and butylparaben preservatives. A sodium chloride salt provides further preservative option and increases the firmness of the gel material.

U.S. Pat. No. 5,374,384 issued to Berks, et al. sets forth a MODELING MEDIUM comprising a mixture of an organic ductile wax binder and a mica platelet filler which is mechanically worked while the material is in a semi-solid state to evenly distribute the mica platelets throughout the mixture.

U.S. Pat. No. 5,506,290 issued to Shapero sets forth a PLASTIC MOLDABLE COMPOSITION providing a cross link gel-like composition of matter. The composition is capable of being used as a modeling compound as well as being moldable, extrudable, stretchable and inflatable into bubbles for use in a play activity. The composition is based on a cohesive polyvinyl alcohol nonadhesive and substantially nondrying composition.

U.S. Pat. No. 3,607,332 issued to Wingfield sets forth a MODELING COMPOSITION providing a thermoplastic modeling composition which is resistant to cracking after having been molded and standing for some time. The compositions are relatively soft and easily molded at elevated temperatures. Distributed throughout the modeling compositions are rigid regularly shaped micro particles which may, for example, be in the form of spheres or platelets.

U.S. Pat. No. 3,384,498 issued to Alurabi sets forth a PLASTIC MODELING COMPOSITION comprising manogalactan gum, alkali metal borate, boric acid, high molecular weight polysaccharide together with preservatives, colorant and fragrance.

U.S. Pat. No. 3,804,654 issued to Liu sets forth a MODELING COMPOSITION including mineral fillers such as clay and talc, hydrocarbon petroleum distillate oil, waxy paraffinic hydrocarbon oil, liquid silicone, which may be shaped and then permanently set.

U.S. Pat. No. 3,809,661 issued to Shapero, et al. sets forth MOLDING COMPOSITIONS AND METHOD OF MOLDING providing a two-part molding composition and method of forming molded rubber and plastic products therefrom which includes a latex phase to which a gellant phase is added.

U.S. Pat. No. 4,336,071 issued to Schnorrer sets forth a KNEADING AND MODELING COMPOUND AND USES THEREOF which is formed of binding agents, plasticizers and/or solvents together with fillers.

U.S. Pat. No. 5,171,766 issued to Mariano, et al. sets forth a MODELING DOUGH including a gelled polyvinyl alcohol, water and a filler to provide resistance to flaking, cracking and crumbling.

U.S. Pat. No. 3,634,280 and a continuation-in-part thereof U.S. Pat. No. 3,661,790 both set forth a GLOWING BOUNCING PUTTY which includes a photoluminescent material within a putty.

U.S. Pat. Nos. 3,886,112 issued to Watson, et al.; 3,632,786 issued to Nickerson; and 3,135,648 issued to Hawkins set forth various polyvinyl alcohol adhesives.

U.S. Pat. Nos. 4,618,491 issued to Kanematu, et al; 3,873,485 issued to Fichera; and 2,541,851 issued to Wright set forth various gel compositions and elastic materials.

In a related art, various combinations of particulate material such as sand are combined with various binders to provide sand cast molds for use in casting material such as metal. For example, U.S. Pat. No. 3,977,236 is issued to Neukom sets forth a CORE BINDER utilizing an alkali metal phosphate modified starch for the core binder.

U.S. Pat. No. 4,080,213 issued to Mori, et al. sets forth a SAND MOLD COMPOSITION FOR METAL CASTING including a molding sand and pullulan of a binder therefor. The pullulan binder provides advantages of reduced gas, dust, noise and vibration during the pulling and stripping steps.

U.S. Pat. No. 4,231,914 issued to Born, et al. sets forth a POLYURETHANE-BASED BINDER SYSTEM FOR THE PRODUCTION OF CASTING MOLDS OR CORES. A polyurethane binder is used in combination with a solvent consisting of an ester having as its acid component an aliphatic dicalboxylic acid.

U.S. Pat. No. 4,459,375 issued to Saeki, et al. sets forth a RESIN COATED SAND FOR SHELL FOUNDRY PROCESS which may be formed in shell molds. Upon casting the molten metal into these molds, the abrupt thermal expansion of the coated sand is controlled to eliminate the cracking which occurs when conventional phenolic sand mixtures are used.

U.S. Pat. No. 4,459,377 issued to Saeki, et al. sets forth a SHELL MOLDING RESIN COATED SAND for use in foundry shell molding applications which have increased resistance for thermal shock at the time of pouring. A phenolic resin is used of a binder together with aromatic compounds is provided.

U.S. Pat. No. 4,460,716 issued to Saeki, et al. set forth a COATED SAND COMPOSITION AND METHOD FOR PRODUCING SAME in which the resin utilized is a phenolic resin containing a bronaphenol. The resin coated sand has improved shake-out properties and is especially formulated for low melting metals such as aluminum castings.

U.S. Pat. No. 5,473,009 issued to Kimura, et al. sets forth a MOLD MATERIAL COMPOSITION AND METHOD FOR PREPARING MOLD while U.S. Pat. No. 5,491,180 issued to Kiuchi, et al. sets forth a BINDER COMPOSITION FOR MOLD MAKING, BINDER/CURING AGENT COMPOSITION FOR MOLD MAKING, SAND COMPOSITION FOR MOLD MAKING AND PROCESS OF MAKING MOLD.

U.S. Pat. No. 4,891,266 issued to Keith sets forth a SCULPTING MATERIAL AND METHOD OF MANUFACTURE AND USE providing a quantity of granular material having grains individually coated with paint and a water-resistant binder binding the coated grain together into a side dry carvable block.

While the foregoing described prior art materials have produced improvement in the art and, in many instances, enjoyed commercial success, there remains nonetheless a continuing need in the art for evermore improved interesting and amusing play material compounds.

SUMMARY OF THE INVENTION

Accordingly, it is a general object of the present invention to provide an improved malleable play material compound. It is a more particular object of the present to provide an improved malleable play material compound which provides a novel texture and tactile feel characteristic. It is a still more particular object of the present invention to provide an improved malleable play material compound which facilitates play patterns indoors traditionally associated with outdoor play in sand or loose soil.

In accordance with the present invention, there is provided a malleable play material for use by children comprising: a malleable amorphous binder; and a large quantity of sand in which the binder is sufficient to hold the sand while allowing the mass to respond and behave somewhat similar to loose sand or soil.

BRIEF DESCRIPTION OF THE DRAWING

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 1 sets forth a process flow diagram of the manufacture of the present invention malleable play material compound.

DESCRIPTION OF THE PREFERRED EMBODIMENTS

The present invention malleable play material compound recognizes the creation of a play material compound having an unusual tactile feel utilizing a combination of a malleable binder and a large quantity of sand. The combined granular character of the sand together with the adhesive properties of the malleable play material binder result in the creation of a play material which is different from previously created play materials and which while maintaining a mass behaves much like loose sand or soil in that it easily tears, packs and recombines. In the preferred embodiment of the present invention, the binder is present in sufficient quantity to prevent the sand from separating from the mass as "loose" particulate. That is to say, in the preferred embodiment of the present invention, sufficient binder is present in the mixture to loosely hold the sand particles and allow the play material compound to be severable or dividable much like loose sand or soil while preserving its tendency to maintain the sand in the amorphous mass to facilitate play patterns typical of loose sand or soil.

It will be recognized by those skilled in the art that a substantial variety of play material compounds may be used to provide the binder portion of the present invention play material compound. The important characteristics of the binder are malleability, sufficient adhesive properties to hold the large amount of sand, a loose adhesion to the sand and a nonstick feel. In the preferred embodiment of the present invention, the proportionate parts of malleable play material binder and sand are set forth in table 1.

TABLE 1

| Ingredient | Percent by Weight |
| --- | --- |
| Mallable Binder | 10.00–20.00 |
| Sand | 90.00–80.00 |
| Fragrance | As needed |

As can be seen in Table 1, the malleable play material binder preferably comprises between ten and twenty percent by weight while the sand combined with the malleable play material binder preferably comprises between ninety and eighty percent. In addition and as is also seen in Table 1, the preferred embodiment of the present invention adds a fragrance material as needed. The fragrance material is added solely to enhance the fragrance of the compound and thus no minimum or maximum percentage weight of fragrance material is set forth in Table 1. Rather, the fragrance material is provided in an "as needed" basis.

As mentioned above, the variety of play material compounds may be utilized to provide the malleable binder for the present invention play material. However, in the preferred embodiment of the present invention set forth below in Table 2, the play material has been found to provide the desired adhesive characteristic to support a substantial quantity of sand in the play material mixture and is unique in its tactile properties and its ability to allow tearing and separation of the mass. Thus, the present invention play material has been found to provide an advantageous binder for use in the present invention. However, once again, it must be emphasized that other binder materials may be used without departing from the broader spirit and scope of the present invention.

Table 2 sets forth the composition of the resulting preferred embodiment play material compound combining the present invention play material binder with sand and a fragrance in general accordance with Table 1 above. The inventive compound provides a moldable sand compound having a dough-like consistency in which the sand remains bound within the mass and does not come off on the user's hands. The compound is provided by mixing a soluble cellulose, a polyvinyl alcohol, propylene glycol, water, sodium tetraborate, sodium carbonate and a light mineral oil.

TABLE 2

| Ingredients | Percent by Weight (Preferred Percentage) | Acceptable Range |
| --- | --- | --- |
| 1. Klucel HF (Soluble hydroxypropyl cellulose) | 2.41 | 1.5%–3.0% |
| 2. Propylene Glycol | 69.25 | 60.0%–75.0% |
| 3. Airvol 205 (polyvinyl alcohol) | 5.35 | 4.0%–7.0% |
| 4. Deionized Water | 15.78 | 10.0%–20.0% |
| 5. Sodium Carbonate | 1.06 | 0.5%–1.5% |
| 6. Sodium Tetraborate | 5.48 | 4.5%–6.5% |
| 7. Phenonip (light mineral oil) | 0.67 | 0%–1.0% |
| Total Weight (Binder) | 100.00 | |
| Part I (Binder) | 14.91 | |
| Part II (Sand) | 84.46 | |
| Glycerine | 0.48 | |
| Penetek | 0.09 | |
| Fragrance | As Required | |
| Total Weight (Compound) | 100.00 | |

By way of overview, it will be noted that in the compound set forth in detail in Table 2, it should be noted that ingredients numbers 1 through 7 are combined to form the preferred binder material which conforms generally to the above-mentioned material characteristics. Thus, the percent by weight expressed for ingredients 1 through 7 referred to the percentage by weight of the binder material. Accordingly, table 2 shows a total weight for the binder portion of one hundred percent. Below the ingredients numbered 1 through 7, the percentage by weight of binder and sand is expressed in terms of the percent by weight of the table compound. Also shown in Table 2 is an ingredient referred to as "fragrance" which in the preferred fabrication of the present invention play material comprises a small quantity of a commercially available suntan lotion. It will be recognized by those skilled in the art, however, that the fragrance ingredient may be varied or omitted without departing from the spirit and scope of the present invention.

More specifically and with reference to Table 2, the binder portion of the present invention compound is formed of seven basic ingredients numbered 1 through 7 in Table 2. Thus, the binder portion of the compound includes a soluble cellulose such as Klucel HF manufactured by the Aqualon Company present as two and a half percent by weight together with propylene glycol which serves as a humectant and solvent and which is approximately seventy percent by weight. The Klucel HF and propylene glycol show acceptable ranges of percentage composition of one and a half to three percent and sixty to seventy-five percent respectively. The composition further includes a polyvinyl alcohol such as Airvol 205 at slightly less than five and a half percent and having an acceptable percentage range of four to seven percent. Deionized water preferably at slightly less than sixteen percent is included and is acceptable in percentages between ten and twenty percent. Sodium carbonate provides a pH adjuster used approximately one percent by weight and having an acceptable percentage range of one-half to one and a half percent. Sodium tetraborate is a cross-linking agent used at slightly less than five and a half percent preferably but usable in acceptable ranges of four and a half to six and a half percent. Phenonip which is a preservative is used at less than one percent with acceptable range of zero to one percent. The combination of elements 1 through 7 provides a total binder weight of one hundred percent.

As is also shown in Table 2 utilizing the combination shown for the binder, the completion of the present invention compound utilizes slightly less than fifteen percent of the binder thus formed together with slightly less than eighty-five percent of sand. In addition, small amounts of Glycerine and Penetek each less than one percent are combined with the binder and sand. Finally, a fragrance is employed on an as required basis.

Thus, ingredients 1 through 7 in Table 2 combine to provide a malleable play material binder. It will be noted that Table 2 also sets forth ranges of percentage variation of the present invention binder. In further accordance with Table 2 and in correspondence to Table 1, the binder is combined with a quantity of sand in a fifteen percent to eighty-five percent by weight ratio. Finally, a small amount of Glycerine and Penetek is shown combined with the binder and sand to complete the play material compound and optimize its unique "feel".

FIG. 1 sets forth a flow diagram setting forth the manufacturing process for the present invention play material compound. Initially, at steps 10 and 11, a pair of premixes are formed which are then combined at step 12 afterwhich the composition is completed to provide the present invention play material compound. More specifically, at step 10, a first premix is formed by heating the propylene glycol to one hundred eighty degrees Fahrenheit and thereafter adding the Klucel HF soluble cellulose slowly while constantly stirring. A second premix is formed concurrently by heating the deionized water to one hundred eighty degrees Fahrenheit and adding the Airvol 205 polyvinyl alcohol while continuously mixing. Once the first and second premixes are formed, they are combined and stirred at step 12. At step 13, the sodium carbonate and Phenonip are added to the composition and continuously mixed. At step 14, the sodium tetraborate cross-linking agent is added and mixed until the resulting composition has cross-linked and assumed a gel-like consistency. At step 15, the sand is added and the resulting combination is mixed until homogenous assuring that the sand is captive within the binder. At step 16, a small quantity of Glycerine is added while mixing continues and at step 17 the Penetek is added and the mixture is essentially formed. Optionally, a quantity of fragrance material as required may be added with the Penetek at step 17.

The resulting mixture completes the present invention compound in which the sand provides a soil-like tactile characteristic is sufficiently bound within the binder to avoid the loss of loose sand from the compound.

It will be recognized by those skilled in the art that, as is set forth in Table 2, variations of the respective percentages of components set forth above in Table 2 as "preferred" may be undertaken without departing from the spirit and scope of the present invention. The important aspect with respect to the present invention is the combination of a malleable play material to be used as a binder when combined with a substantially greater proportion of sand yielding a play material having a novel and unusual tactile characteristic. The resulting play material compound may be utilized in accordance with a variety of play material patterns such as those presently used by children while playing in loose sand or soil. In addition, the present invention play material compound may be used in combination with conventional material extruders or other molding or forming apparatus. Finally, the present invention play material compound may be utilized in hand molding or manipulation in which substantial enjoyment and amusement is provided in the handling of the play material.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. A malleable play material for use by children providing a substitute for loose sand or soil, said play material comprising:
    a malleable amorphous binder having an adhesive characteristic which loosely adheres to sand and having a nonstick surface feel; and
    a quantity of sand mixed with said binder to form a material mass in which said sand is loosely held by said binder and in which said mass may be easily torn, separated or packed.

2. A malleable play material as set forth in claim 1 wherein said binder comprises less than one fourth of the combined play material.

3. A malleable play material as set forth in claim 2 further including a fragrance material.

4. A malleable play material for use by children comprising:
    fifteen parts by weight of a malleable binder wherein said binder includes hydroxypropyl cellulose, propylene glycol, polyvinyl alcohol, water, sodium carbonate and sodium tetraborate; and
    eighty-five parts by weight of sand, said sand mixed with said binder to form a material mass in which said sand is loosely held by said binder and in which said mass may be easily torn, separated or packed.

5. A malleable play material binder comprising the following materials expressed as percent by weight of said binder:

| Ingredients | Percent by Weight (Preferred Percentage) |
| --- | --- |
| Soluble hydroxypropyl cellulose | 2.41 |
| Propylene Glycol | 69.25 |
| Polyvinyl alcohol | 5.35 |
| Deionized Water | 15.78 |
| Sodium Carbonate | 1.06 |
| Sodium Tetraborate | 5.48 |
| Light mineral oil | 0.67. |

6. A malleable play material as set forth in claim 5 further including a fragrance material.

7. A malleable play material binder comprising the following materials expressed as percent by weight of said binder:

| Ingredients | Percent by Weight (Preferred Percentage) |
| --- | --- |
| Soluble hydroxypropyl cellulose | 1.5%–3.0% |
| Propylene Glycol | 60.0%–75.0% |
| Polyvinyl alcohol | 4.0%–7.0% |
| Deionized Water | 10.0%–20.0% |
| Sodium Carbonate | 0.5%–1.5% |
| Sodium Tetraborate | 4.5%–6.5% |
| Light mineral oil | 0%–1.0%. |

* * * * *